Jan. 9, 1968 J. T. LAMB ET AL 3,363,080
ELECTRONIC COOKING OVEN
Filed March 30, 1965 2 Sheets-Sheet 1

INVENTORS.
JOHN T. LAMB
CARL L. ANDERSON
Oberlin, Maky & Donnelly
ATTORNEYS

INVENTORS.
JOHN T. LAMB
CARL L. ANDERSON

Oberlin, Maky & Donnelly
ATTORNEYS

United States Patent Office 3,363,080
Patented Jan. 9, 1968

3,363,080
ELECTRONIC COOKING OVEN
John T. Lamb, Mansfield, and Carl L. Anderson, Shiloh, Ohio, assignors to The Tappan Company, Mansfield, Ohio, a corporation of Ohio
Filed Mar. 30, 1965, Ser. No. 443,930
10 Claims. (Cl. 219—10.55)

ABSTRACT OF THE DISCLOSURE

An electronic food heating oven having a base cabinet which is accessible at two opposite sides and has at the top a bottom oven section which is open upwardly and contains a platform on which food to be heated can be placed by hand from either of such sides. An upper oven enclosure is supported in spaced relation above the bottom section, and the latter is vertically reciprocated by drive means between its lowered food-receiving position and an elevated position against the upper section to form the cooking cavity. A source of high frequency energy is housed within the cabinet, and the closure of the oven and supply of such energy are controlled by photocell circuits which initiate the operation in response to placement of an article of food on the platform from either of such sides. There are two such control circuits respectively for such sides, with the actuation of one preempting the cycle control. A safety band extends about the bottom of the upper oven section and it is relatively movable to sense obstructions between the sections as they come together and interrupt the closing drive through switch means actuated by such relative movement. The power means supplying the high frequency energy is also controlled in response to the movement of the lower section so that the energy will not be supplied unless the oven is fully closed. The drive of the bottom section also includes coupled sections which are relatively movable and resiliently latched to yield when a predetermined degree of opposition to raising of the bottom section is experienced.

---

Figure 1:
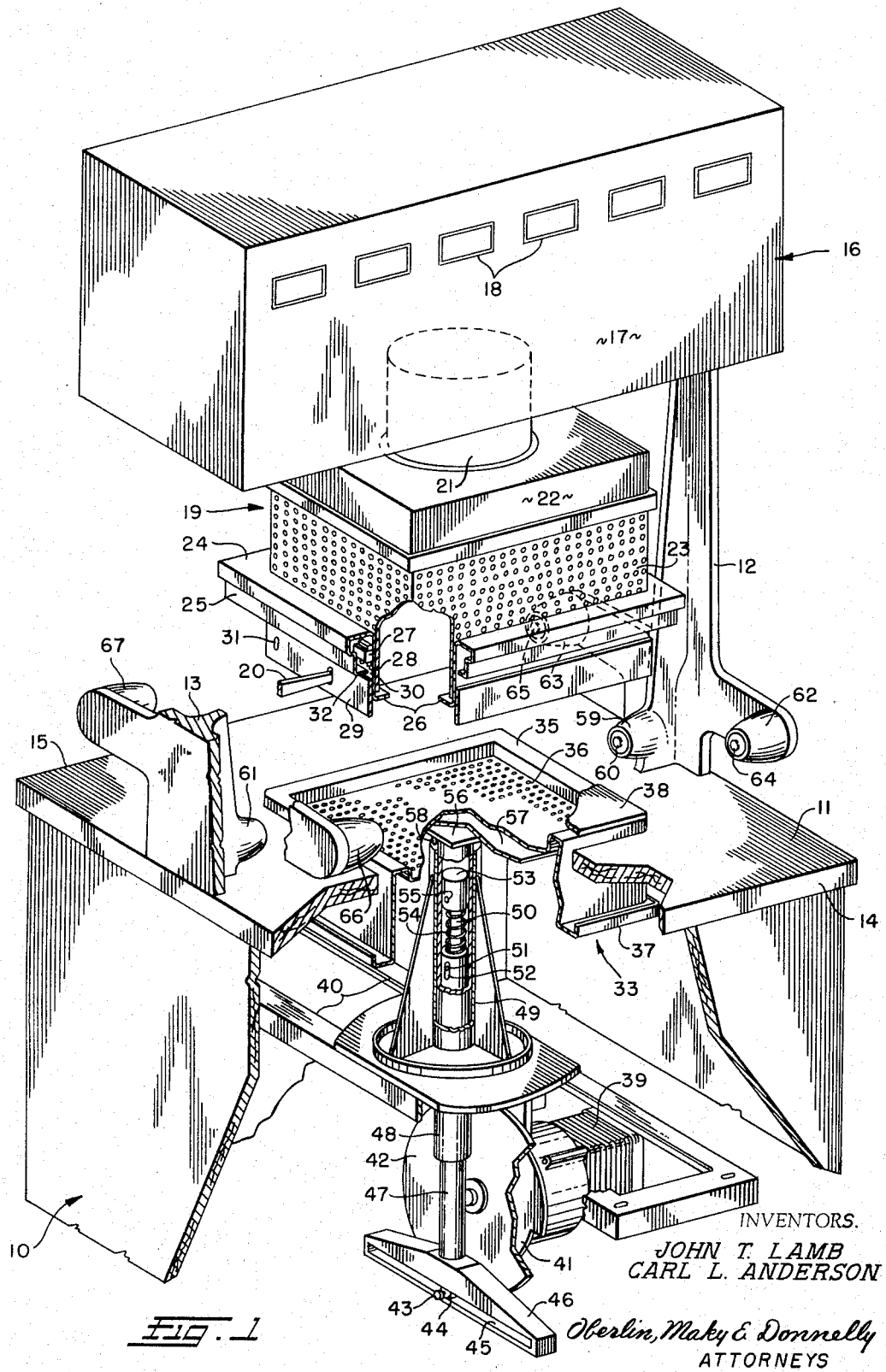

This invention relates, as indicated, to structure for the cooking of food with high frequency energy, such as microwave energy, which has been widely applied for this purpose.

It is, more particularly, of concern in the present improvements to provide a construction which is in one form very well suited for commercial food dispensing operations, for example, in an essentially self-service environment in which prepackaged food is obtained from vending machines and heated in the electronic oven. For such a commercial installation, it is an object of the invention to provide a microwave oven of "island" formation which can be operated selectively from opposite sides, whereby such a construction can be centrally located and accessible to prospective users at both sides of the unit. Such an arrangement would, for example, permit the food vending equipment to be located against opposite walls of a room, with the oven unit or units in the middle, for very high utilization of available space.

In this type of oven operation, the availability of the oven from either of two sides makes it desirable that there be some protection against the user at one side interfering with an operation commenced previously by the user at the opposite side, and it is therefore an object of the invention to provide such an oven construction in which this type of interference is automatically precluded.

A more specific object of the present invention in this essentially commercial form is to include in the control mechanism means whereby the initiation of an operation from either side automatically preempts the unit for the duration of the thus commenced operation.

In this dual form, and in a modified form in which the oven is made accessible from only one side, it is further desirable that the placement of the food for cooking be very easily accomplished and that the operation thereafter should proceed automatically to completion, with no special skill or instruction of any complicated nature being required on the part of the user. For these purposes, the present invention contemplates an oven having relatively movable parts which are normally in separated relation to facilitate insertion of the food.

It is a further object of the invention to provide an electronic oven structure in which the act of insertion of the food determines commencement of the operation which entails, first, automatic closure of the sections of the oven about the article of food, second, carrying out of a timed period of energy exposure selected for the cooking desired, and, third, automatic opening of the oven for removal of the cooked food.

It is another object to provide an electronic oven which will operate as aforesaid with the controls being such that only selection of the proper time for the cooking interval is required by the user as an actual control step.

Since the oven thus proposed is made of two relatively movable sections, and these are automatically brought together and separated, it is also desirable that the user be protected against improper or inadvertent use of the equipment, especially in the closing of the oven which is effected by power means. It is, accordingly, another object of the invention to provide means in such an oven for immediately terminating the operation once commenced in the event of resistance or interference in the closing of the oven, such as might occur, for example, by accidental insertion of a member between the two sections of the oven as they are being brought together.

Briefly, the invention contemplates an oven construction for high frequency cooking or heating in which there is a stationary major oven part held in an elevated condition relative to a deck conveniently at counter height, with a complemental section of the oven being normally within a recess in such deck and elevated by power means for closure of the oven cooking cavity. This arrangement permits the article or food to be placed upon the movable bottom, essentially flush with the deck or counter when retracted, with the operation such as to proceed automatically with the lifting of the food from this placement into the combined oven enclosure and to be returned after the cooking operation has been completed for removal with the same convenience. According to the preferred form of the invention, the placement of the food actuates the elevating mechanism and continues the control through the cooking cycle and bottom retraction stages. Moreover, in the dual form of the oven, there are two control sections available at the opposite sides of the unit for prospective users, with the start of an operation from one side disabling the control section for the other side and thereby ensuring against interference as above noted.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but one of the various ways in which the principle of the invention may be employed.

Figure 2:
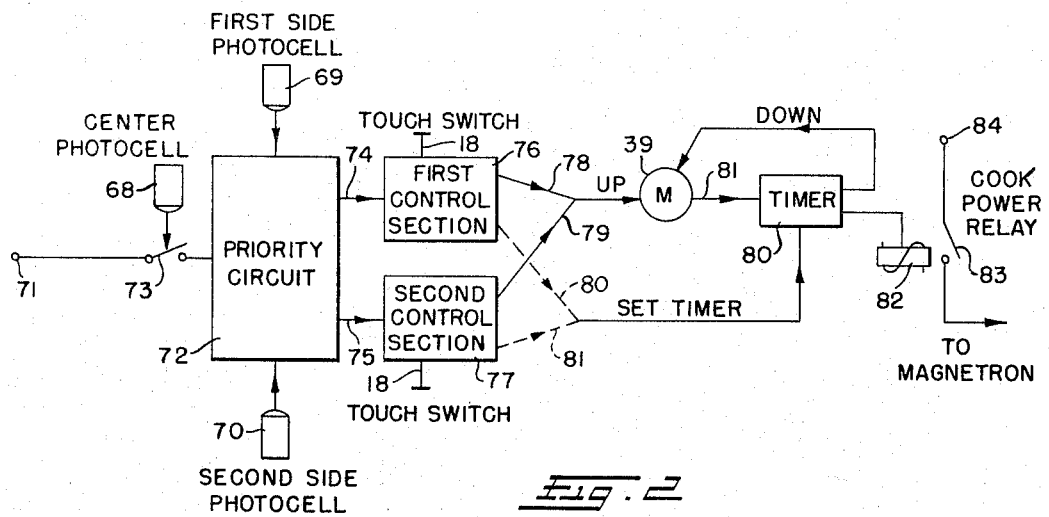
Figure 3:
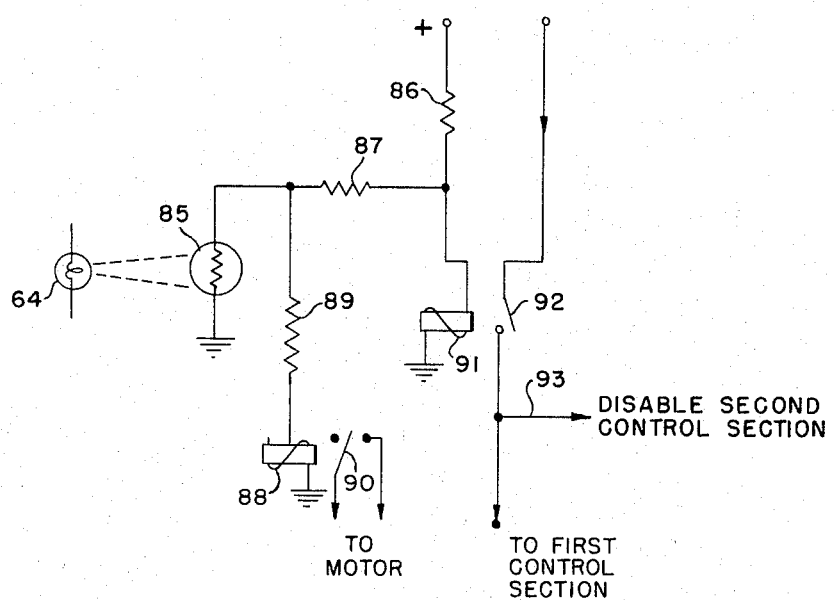

In said annexed drawings:
FIG. 1 is a perspective view of an electronic oven in accordance with the present improvements, parts thereof being broken away in obvious manner to facilitate convenience and understanding of the construction;

FIG. 2 is a schematic diagram of the control system provided for such oven, with this embodiment being of the "island" or dual form noted; and FIG. 3 is a simplified part of the control circuit illustrating the manner in which an operation is commenced.

Referring now to the drawings in detail, reference numeral 10 designates a fragmented floor-standing cabinet which is generally square in horizontal cross section with a top deck 11 and two support posts 12 and 13 extending upwardly therefrom centrally at opposed sides of the deck. The cabinet 10 is suitably finished and the deck preferably at counter height, with the unit in fact being finished on all sides in order that it may stand alone within a fully surrounding work space and, further, in order to provide access from either of the two sides 14 and 15 which are unobstructed, these being the sides complemental to those at which the vertical supports 12 and 13 are located.

The latter, and it will be obvious that the support 13 in the foreground has been broken away both vertically and in some horizontal extension to be further discussed, serve to mount a top control assembly which is shown in simplified form and designated generally by reference numeral 16. At the near approach side 17 in this illustration, the control assembly is shown as provided with a series of pads 18 which represent switch actuators for variably selecting the time of the cooking operation desired as will be hereinafter more fully explained. It should be understood here that the opposite approach side of this assembly is also provided with such switch members, with these being, for example, in the form of touch switches of commercially available form, and the assembly thus actually comprises two complete control sections.

Also within the control assembly 16, there is housed the magnetron, not shown, for generating the high frequency energy to be employed for cooking. The nature of this power source is well-known in microwave oven constructions and will not be described here in detail, since this area does not form any particular part of the present improvements. It is preferred that the relatively heavy power pack for the magnetron be located in the base portion of the cabinet to simplify the structural arrangement to obvious advantage, with only the output energy needed for the magnetron carried to the top control assembly.

This top control assembly 16 is at a substantial spacing above the deck 11, and supported in slight spaced relation therebeneath is an upper oven enclosure section designated generally by reference numeral 19. This section is thus suitably mounted in fixed location, with horizontal support extensions, one of which is shown broken at 20, extending thereto respectively from the vertical support posts and a suitable wave guide 21 extending between the magnetron source within the top control assembly and the top wall of the oven section 19, the latter having an opening through which the high frequency electromagnetic energy is introduced to the cavity.

This stationary upper oven section 19 is shown as having an imperforate top portion 22 and, depending therefrom, a continuous wall 23 having perforations which are of such size as to effectively choke any emission of the energy therethrough, this being again known in commercial microwave oven assemblies. The perforations, of course, permit venting and a degree of visual inspection. Such fixed oven section is illustrated as being square in horizontal section, and there is a bottom peripheral extension 24, which is imperforate and forms a surrounding external channel 25 and a bottom inturned horizontal flange 26. The actual bottom of this oven section is therefore defined by the noted horizontal flange.

The external channel 25 encloses microswitches, preferably one on each side, as indicated by reference numeral 27, fixed to the stationary structure and with downwardly projecting actuator pins 28 also enclosed by the channel.

For the purpose to be described, a continuous band 29 of metal, shaped as a square, is disposed to overlie the interior vertical wall 30 of the fixed bottom member 24 and such band is loosely supported on a suitable number of pins fastened to member 24 and engaged in slots in the band, such as shown at 31. The band also is slotted to accommodate passage of the horizontal support extensions 20 which bridge between this oven section and the vertical support posts, and all such slots are vertically elongated in order to permit a degree of relative vertical movement of the band. It will also be seen that the external horizontal flange 32 of the channel 25 does not actually abut the vertical wall 30 and is, in fact, spaced outwardly therefrom a sufficient distance to accommodate relative insertion of the band 29 when lifted. The placement of the microswitches 27 in respect of this permitted movement of the band is such that elevation of the latter will actuate the switches, and this control effect is utilized to terminate the operation of the oven. In other words, this movable bottom band operates as a safety, with this feature being more fully apparent from the further description to follow.

The thus described fixed oven section 19 provides the major portion of a hollow cube to serve as the oven cavity in which the cooking takes place and, in the illustrated embodiment, the completion of the cavity is provided by a vertically movable bottom oven section designated generally by reference numeral 33. This bottom section, which is accommodated in an opening provided in the counter or deck 11, is in the general form of a pan having an imperforate continuous peripheral wall 34, which terminates in an upper channel surface 35, and a horizontal bottom wall 36 having perforations on the same order and for the same effect as the perforations noted earlier in the upper oven wall 23. By providing such bottom perforations, the interior of the oven can, if desired, be illuminated by means of a suitable light source beneath the bottom wall 36. As will be seen, this bottom wall is actually intermediate the top surface 35 of this oven section and a flange 37 which extends outwardly about the lowermost end of the section wall 34, with the depth of such bottom location being such as to form the minor portion of the oven cavity when associated with the upper portion in the closed oven condition.

A support sheet 38 of a non-conductive material which is for practical purposes transparent to the electromagnetic wave energy supplied to the cavity extends over the exposed top of the bottom section and is thus in the nature of a false bottom on which the articles of food to be cooked are supported. The dimensioning in the horizontal or top plane of the movable bottom section 33 is such as to correspond with the bottom flange 26 of the fixed section 19, whereby the bottom section can be elevated into contact with the flange 26 inside of the safety band 29, so that the normal guided elevation of the bottom section and consequent closing of the cavity as described will not lift the safety band into its switch-actuating position. In this closure of the oven, the sheet 38 provides a solid dielectric seal between the two sections at their opposed margins, and there are a number of synthetic resin materials which can be utilized in this manner, such sealing itself being known in other microwave oven constructions.

The side wall 34 of the movable bottom section is of sufficient height to constitute, in effect, a full enclosure about the true bottom of the cavity in the closed oven position. The drawing shows the bottom oven section in what would be the fully retracted condition, but with some degree of exaggeration of the projection above the top surface of the deck 11 in order more distinctly to illustrate the structural arrangement. In actual practice, the top of the movable bottom platform or section will more likely be substantially flush with the deck top surface for greater convenience in the placement and removal of the food articles.

As indicated earlier, this oven construction includes power means for controllably raising and lowering the bottom section, and such mechanism comprises an electric drive motor 39 supported on suitable framing 40 within the base cabinet 10. The output shaft of this motor drives a cam 41 for actuating control switches, not here shown, and also, synchronously with the cam, a disk 42 on which there is a projecting eccentric pin 43. This pin, with a bushing 44 thereon, extends into a horizontal slot 45 in a foot member 46 from the top center of which there extends upwardly a drive rod 47. It will be apparent that rotation of the disk 42 by the electric motor thus produces vertical reciprocation of the rod 47.

The upper end of rod 47 enters a sleeve 48 which is slidable or vertically reciprocable within a support and guiding housing 49 fixed also on the internal framing 40. Moreover, the upper end of the rod thus enclosed is counterbored to receive a plunger 50, with the attachment of the two being effected by means of a pin 51 extending transversely through the telescoped portion of the plunger and at its ends into vertical slots 52 provided in the wall of the thus bored end of the rod 47, whereby the plunger is capable of limited relative vertical movement. The upper end of plunger 50 carries a head 53, and there is a spring 54 disposed between the underside of this head, around the plunger, and the upper end of the rod 47, so that there is spring tension normally urging the plunger to its upper maximum outward position in respect of the rod. The head 53 has a transverse bore in which there is seated a ball 55 backed by a spring, not shown, and such ball is urged by the spring into an opening provided for partial reception of the same in the wall of the sleeve 48. Preferably the head will have two such ball-spring latches diametrically oppositely acting and thus serving normally to provide driving interengagement from the rod 47 to the sleeve 48 through the plunger and head assembly just described. The upper end of sleeve 48 carries a plate 56 which in turn bears against another somewhat larger plate 57 arranged against the underside of the bottom 36 of the movable oven section 33.

The elevation and retraction of the bottom section is accordingly accomplished by energizing the electric drive motor 39 which, in turning the disk and eccentric pin, causes the rod 47 to reciprocate vertically, with the drive being transmitted through the medium of the ball-spring latches. The last named devices actually will be seen to provide another safety feature, since a substantial predetermined opposition or resistance to the lifting of the bottom section will cause the sleeve to override the balls and move relatively to the drive rod to the extent provided by the noted pin and slot interengagement between the rod 47 and the plunger 50. A switch can accordingly be interposed suitably in this drive mechanism to be actuated by this last noted relative movement, such as the switch 58 shown between the plate 55 and the top end of the stationary guide column 49, with this switching device connected to interrupt the power to the unit and, of course, also to the motor to terminate the drive automatically upon such occurrence.

The safety band 29 associated with the upper oven section is therefore one of two safety switching features, and it is more sensitive than the ball-spring override switching assembly. If the safety band for any reason thus does not function as it should, for example, by being lifted by an improperly inserted member between the rising bottom oven section and the fixed top oven section, across the peripheral boundary of the same, then there would be reached a point of interference or resistance adequate to actuate the second safety switch 58 in the manner set forth.

With regard now for the preferred system of control which provides fully automatic operation of this oven, mention has, of course, already been made of the touch switches 18 in the top control console, noting that there is a series of such switches at each approach side of the unit and that these are intended to provide different selected intervals of time for the high frequency energy supply to the closed oven cavity. In FIG. 1, there are additional control elements in the form of photocells and respectively associated light bulbs in a particular spatial arrangement providing three light signal beams as to be more fully described. Each circuit of this type, of course, requires a light source and a photocell in spaced relation to the particular source and in such orientation as to be responsive to the line transmission of the light from the source to the cell.

On the vertical support post 12 there is a hollow projection 59 which is centered and directed across the deck 11 substantially in the plane of the top sheet 38 of the movable bottom oven section. This projection houses an electric lamp 60, and there is an opposed hollow projection or socket 61 containing a conventional photocell in the same relative positioning on the opposite support post 13, whereby a first light beam is established extending centrally across the bottom section platform of the oven in the fully withdrawn condition of the latter.

The support post 12 is also formed to mount a pair of further sockets 62 and 63, respectively, housing electric lamps 64 and 65, in the same plane elevated somewhat with respect to the central lamp 60 on this post and respectively displaced to both sides as illustrated. These two further light sources are opposed by corresponding sockets 66 and 67 on extensions of the support post 13, with these also containing photocells of commercially available type, so that two additional light beams are established uniquely related respectively with the approach sides of the oven.

The disposition of these light sensitive control elements is such that a user at one approach side or the other extending his hand to place an article of food on the support sheet or platform 38 of the bottom oven section will unavoidably interrupt the relatively displaced light beam at that particular side. Moreover, the food article itself, when resting on the support sheet 38, approximately in the middle, interrupts the central light beam, with this action obviously being common in use of the oven from both of its such sides.

The schematic diagram of FIG. 2 demonstrates in simplified form this arrangement of photocell actuated circuits by small boxes 68, 69 and 70 having applied thereto the legends "central photocell," "first side photocell," and "second side photocell." The terminal 71 is representative of a conventional electrical power input and there is a connection of the same to a block 72 marked as representing a priority circuit, with a switch 73 in this circuit connection which is actuated through circuit 68 to close upon the aforesaid interruption of the center light beam. The two other photocell circuits 69 and 70 both result in signals applied to the priority circuit 72, which serves also as a safety for the electric drive motor 39, and the purpose of this circuit, as the term implies, is to permit the first applied photocell input signal from either the first or second control side to preempt operation of the oven. The priority circuit is shown as being capable of applying an output to separate first and second control sections as indicated by the connections 74 and 75 to the thus marked blocks 76 and 77, and each of these control sections is also influenced by actuation of one of the touch switches 18 previously noted and as shown by the legends in single simplified form in this illustration. The lines 78 and 79 extend respectively from the first and second control sections 76 and 77 commonly to the electric drive motor 39 which provides the elevation and retraction of the bottom oven section, with these lines representing the transmission of a signal from one or the other of such control sections to produce the lift operation of the motor for closure of the oven cavity. The dashed lines 80 and 81 respectively extending from the first and second control sections 76 and 77 both proceed to a timer 80, which may be of any suitable form, and it is through this connection that the particular desired time period for the cooking operation is established in the timer. The timer, as indicated by the line 81 connecting the same with the motor, is not effective to commence the cooking operation until the motor has completed the lift of the bottom oven section for full sealed closure of the oven cavity. When this last condition is satisfied, the motor is turned off and the timer energizes the solenoid of a power relay 82 to close a switch 83 in the circuit extending from the magnetron power input 84 terminal to the magnetron. At the end of the selected cooking interval, the timer causes the switch 83 to open to discontinue the power energization of the magnetron and then energizes the motor 39 to operate again, this time to effect the retraction or lowering of the bottom section. The motor is of course turned off when full retraction is effected.

A simplified circuit for the priority portion 72 of the above-described system is shown in FIG. 3 as comprising the lamp 64 and photocell 85 which serve the first side photocell portion 69 of such diagram. The photocell has a relatively low control voltage applied thereto through a first resistor 86 and a second resistor 87 effectively in series as far as the cell circuit is concerned. The photocell is in shunt with a relay coil 88 having in its shunt circuit a further resistor 89 and being operative to close a switch 90 when energized which is disposed, as indicated by the legend, in the circuit for energization of the electric drive motor 39. Also in parallel with the photocell and the relay 88, but without inclusion of the resistor 87, there is another relay coil 91 operable when energized to close a switch 92 in a supply line extending to the first control section 76 and having on the same side of this switch, a branch circuit 93 effective to disable the second control section 77. It will be appreciated that the photocell 85, when receiving light from the source 64 acts as a bypass to the two relays 88 and 91 respectively in the motor and control section circuits. When this light reception is interrupted, the impedance of the cell is relatively increased sufficiently for relay operating current flow in the thus normally shunted circuits and hence closure of the switches 90 and 92.

It will be understood by those familiar with the art that a variety of circuit components and arrangements are available for carrying out the previously set forth desired mode of operation of the new oven. Their specific character is thus unimportant, and the true significance is in the concept of the system operation insofar as this invention is concerned. Moreover, it will also be obvious that the type of initiation circuit shown in FIG. 3, will, in the fully illustrated dual or island form of the oven, be essentially duplicated, with one such circuit available at each control side of the unit. The exact manner in which the energization of one of the control sections effects the disabling of the other is also in itself not critical, and the preemption can be realized in a number of circuit arrangements serving the ultimate purpose of disabling the effective means for energization of one of the control sections as an incident to the above-described control energization of the other such section.

All of the basic oven construction, distinguished by formation of the cavity through relatively movable sections, the multiple safety measures disclosed as provided by the band about the bottom of the illustrated top section of the oven and the disengageable connection of elements in the motor drive train, the photocell initiation, and time control of the operation can be utilized as well in an oven which is designed to be more conventionally accessible from only one side. Thus the same principles and features, except for the priority circuit, can be applied to advantage in an oven adapted to be disposed against a wall, for example, in a home kitchen.

With further regard to the safety band or ring feature, it will be obvious that the significant characteristic of the same is switch actuation in response to lifting of the member. The arrangement for this purpose specifically described in the foregoing contemplates that lift or upward movement of the ring causes contact with and resulting operation of the microswitches, and it should be apparent that other mounting arrangements could be utilized for the same effect. For example, the band is made of relatively light gauge metal, having little weight, and it can actually be suspended by the microswitches. In this last arrangement, the band would normally maintain the switches in the actuated condition, the weight being sufficient for this purpose, and lifting of the band would thus release or open switches.

Other modes of applying the principle of the invention may be employed, change being made as regards the details described, provided the features stated in any of the following claims or the equivalent of such be employed.

We therefore particularly point out and distinctly claim as our invention:

1. In an electronic oven having a fixed upper section and a vertically movable lower section, with controlled power means for raising and lowering the latter respectively for closing and opening the oven;

a first safety member operative in response to the presence of a full closure preventing obstruction between the sections in the raising of the lower section to interrupt the drive of the power means producing such closing movement, and a second safety device in such drive of the power means operative to retard the closing movement in response to a degree of opposition to the raising lower section in the event of failure of operation of said first safety member.

2. The combination set forth in claim 1, wherein the second safety device comprises drive parts normally interengaged for unitary movement, but releasably so interengaged to provide a limited degree of relative movement thereof upon the occurrence of such opposition.

3. The combination set forth in claim 2, wherein the first safety member comprises a liftable member suspended on the upper oven section and normally projecting below the bottom edge thereof, whereby such an obstruction causes said member to be lifted, with this relative movement being effective to so interrupt the oven closing drive of the power means.

4. The combination set forth in claim 3, wherein control means initiates the raising of the lower oven section in response to proper placement of an article to be heated on said lower section.

5. The combination set forth in claim 4, wherein timer means produces lowering of the lower oven section after a preselected time of oven closure during which the desired heating is effected.

6. In an electronic oven having relatively movable first and second complemental sections adapted to be separated and brought together respectively for opening and closing the oven; power means for producing such relative movement of the oven sections, platform means carried by one of said sections for support thereon of an article of food to be heated and accessible from more than one side of the oven, and plural control assemblies respectively serving the access sides and selectively determining the cooking operation within the closed oven, said assemblies including light sensitive electric circuit means operative to initiate operation of said power means for closure thereby of the oven in response to placement of the food article on the platform means.

7. The combination set forth in claim 6, wherein the oven is provided with a safety member actuated by a predetermined degree of opposition to closure of the oven to disable said power means and terminate the oven closing movement.

8. The combination set forth in claim 7, wherein there is a second safety device in force-transmitting drive mechanism of said power means operative also to interrupt the oven closing drive thereof in response to a predetermined degree of opposition to closure independent of actuation of the first named safety member.

9. An electronic cooking oven comprising a lower oven enclosure section including a platform for support of food to be heated in the oven, a separable upper oven enclosure section which complements said lower section and together therewith forms the cooking cavity, means mounting said lower and upper sections for relative reciprocation between a united cavity-forming closed positioning thereof and an open condition wherein the sections are separated, the separation in such open condition being sufficient for a user readily to place by hand an article of food on said platform, drive means for causing such relative reciprocation of the sections, power means for supplying high frequency energy to the cavity, first control means for sensing obstructions between the sections in the movement from the open to closed condition and disabling the drive means in response thereto, and second control means responsive to full closure of the section for initiating the high frequency energy supply of the power means.

10. An electronic cooking oven as set forth in claim 9, further comprising means responsive to placement of the food on the platform to initiate operation of the drive means for closure of the sections.

References Cited

UNITED STATES PATENTS

| | | | |
|---|---|---|---|
| 2,577,487 | 12/1951 | Serota | 219—10.67 |
| 2,733,650 | 2/1956 | Williams | 219—10.55 X |
| 2,777,934 | 1/1957 | Falkenthal | 219—502 X |

FOREIGN PATENTS

| | | |
|---|---|---|
| 1,283,501 | 12/1961 | France. |

RICHARD M. WOOD, *Primary Examiner.*

L. H. BENDER, *Assistant Examiner.*